Aug. 25, 1959 E. M. LEYTON 2,901,599

AMPLITUDE-MODULATED RADIO TRANSMITTER COMBINING TWO CONSTANT AMPLITUDE PHASE MODULATED SIGNALS

Filed July 16, 1954 2 Sheets-Sheet 1

INVENTOR.
ERIC M. LEYTON
BY Charles H. Brown
ATTORNEY

Aug. 25, 1959 E. M. LEYTON 2,901,599

AMPLITUDE-MODULATED RADIO TRANSMITTER COMBINING
TWO CONSTANT AMPLITUDE PHASE MODULATED SIGNALS

Filed July 16, 1954 2 Sheets-Sheet 2

INVENTOR.
ERIC M. LEYTON
BY Charles H. Brown
ATTORNEY

United States Patent Office 2,901,599

Patented Aug. 25, 1959

2,901,599

AMPLITUDE-MODULATED RADIO TRANSMITTER COMBINING TWO CONSTANT AMPLITUDE PHASE MODULATED SIGNALS

Eric M. Leyton, Princeton, N.J., assignor to Radio Corporation of America, a corporation of Delaware Application July 16, 1954, Serial No. 443,843

8 Claims. (Cl. 250—17)

This invention relates to amplitude-modulated radio transmitters, and more particularly to transmitters in which an amplitude modulated output signal is produced by generating two phase modulated signals of constant amplitude, amplifying the two signals, and combining the two signals to produce an amplitude modulated output signal.

Radio frequency amplifiers in amplitude modulated radio transmitters should amplify the signal without introducing unwanted phase modulation. In television broadcasting, a phase distorted signal received by a television receiver utilizing inter-carrier sound results in distortion of the received sound signal by the picture signal. In color television broadcasting, it is particularly important to avoid phase distortion because of its degrading effect on the proper reproduction of the color picture.

At the higher frequencies, such as frequencies in the ultra-high frequency television band from 470 to 960 megacycles, it is increasingly difficult to construct a radio frequency amplifier for an amplitude-modulated signal which does not introduce phase modulation. This is because the transit time of the electrons in the amplifying tubes is relatively large compared with the period of signal fluctuations in the tubes. The unwanted phase modulation can be avoided if the radio frequency amplifier tubes are operated at constant amplitude. This is possible if the radio frequency signal to be amplified is in the form of a phase modulated signal of constant amplitude.

A general object of this invention is to provide an improved system for generating an amplitude modulated radio frequency wave which is substantially free of phase modulation.

Another object is to provide an improved television transmitter for generating an amplitude modulated radio frequency signal.

A further object is to provide an improved television transmitter wherein common radio frequency amplifiers amplify both the picture signal and the sound signal.

A still further object is to provide an improved amplitude modifying circuit which delivers an output voltage varying in accordance with a predetermined law as a function of the input voltage.

Magnetrons are very useful at ultra-high frequencies, but, in the present state of the art, difficulties arise when it is attempted to use them for amplifying amplitude modulated radio frequency signals. However, magnetrons can be employed to amplify phase modulated radio frequency signals of constant amplitude. It is therefore a still further object of this invention to provide an improved ultra-high frequency radio transmitter which may utilize magnetron amplifiers.

In one aspect, the invention comprises a television transmitter wherein the video signal $v_1$ is used to amplitude modulate an output of a radio frequency oscillator to provide a voltage vector $V_1$. The video signal $v_1$ is also applied thru an amplitude modifying circuit having an output $v_2=\sqrt{K-v_1^2}$. The signal $v_2$ amplitude modulates an output of the radio frequency oscillator, the carrier frequency of which has been shifted 90 degrees in phase to provide a voltage vector $V_2$. The two 90 degree out-of-phase radio frequency signals $V_1$ and $V_2$ vary in amplitude in such a way that the resultant of the two is a voltage of constant amplitude which varies in phase.

The two radio frequency signals $V_1$ and $V_2$ are combined in a combining unit or diplexer having two outputs. The diplexer may be a split balun bridge diplexer constructed of coaxial line elements as shown and described in Pat. No. 2,454,907, issued on Nov. 30, 1948, to G. H. Brown, and assigned to the assignee of this application. One of the outputs of the diplexer provides the vector sum $V'$ of $V_1$ and $V_2$ and the other output of the diplexer provides the vector difference $V''$ of $V_1$ and $V_2$. The two outputs $V'$ and $V''$ are amplified in two individual radio frequency amplifiers which amplify the constant amplitude phase modulated signals. The amplified outputs $V'$ and $V''$ from the two radio frequency amplifiers are combined in a second diplexer having two outputs. One output of the second diplexer provides a voltage $E_a$ which is the vector sum of $V'$ and $V''$, and the other output of the second diplexer provides a voltage $E_r$ which is the vector difference of the voltages $V'$ and $V''$. The output $E_a$ is applied to an antenna, and the output $E_r$ is applied to an absorbing resistor.

In another aspect, the invention includes means to combine a radio frequency carrier which is frequency modulated by a sound signal with the amplitude modulated radio frequency signal $V_1$, and means to apply the combined signal to one input of the first diplexer. By this arrangement, both the video signal and the sound signal are amplified in common radio frequency amplifiers.

Another feature of the invention is an amplitude modifying circuit having an output which varies as a desired predetermined mathematical function of the input.

These and other objects and aspects of the invention will be apparent to those skilled in the art from the following more detailed description, taken in conjunction with the appended drawings, wherein.

Figures 1, 2:
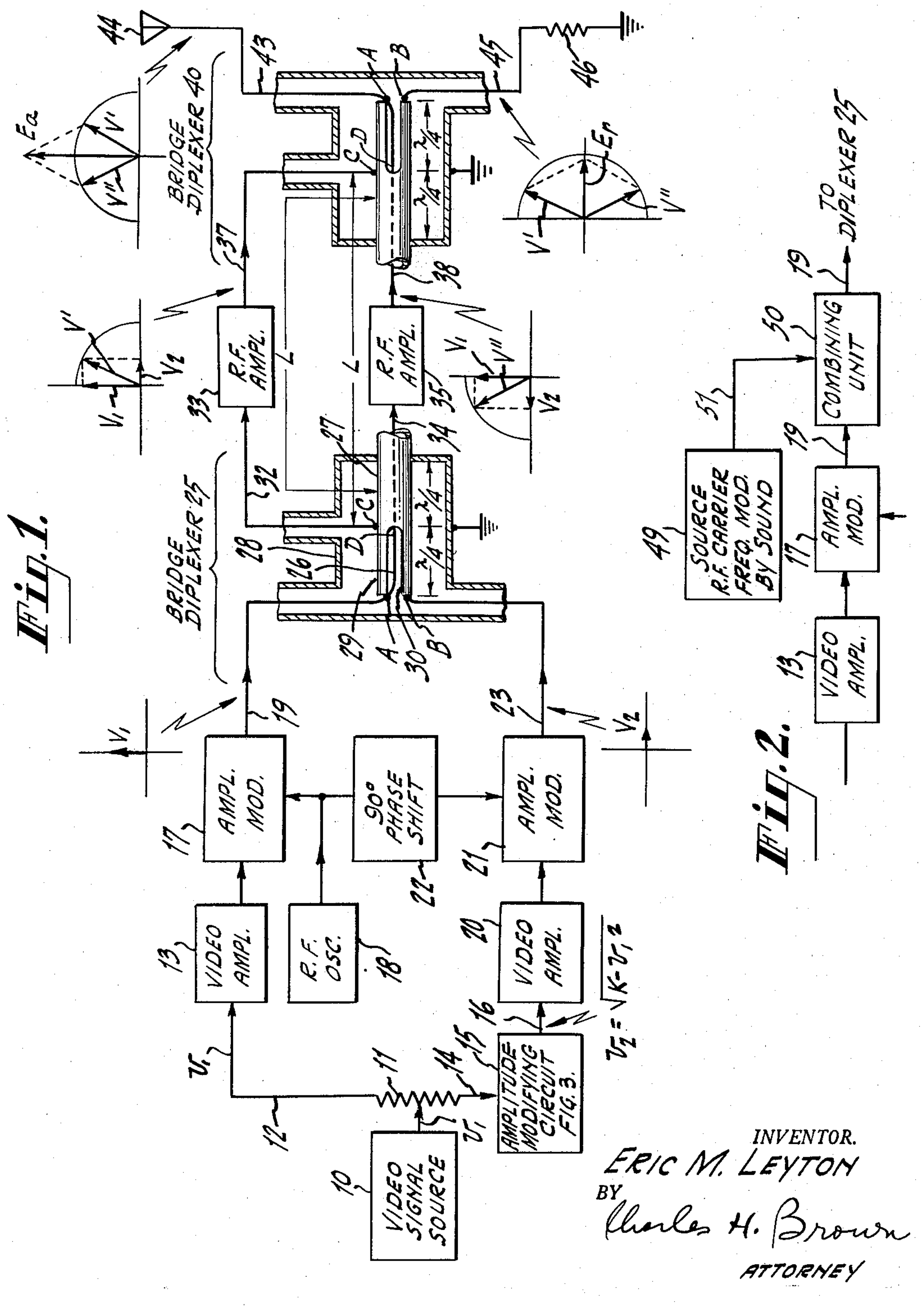
Figure 1 is a block diagram of a television picture modulated transmitter constructed according to the teachings of this invention.
Figure 2 is a block diagram illustrating a modification of the system of Figure 1 whereby a television sound modulated signal may be amplified in the same transmitter with the picture modulated signal.
Figure 4:
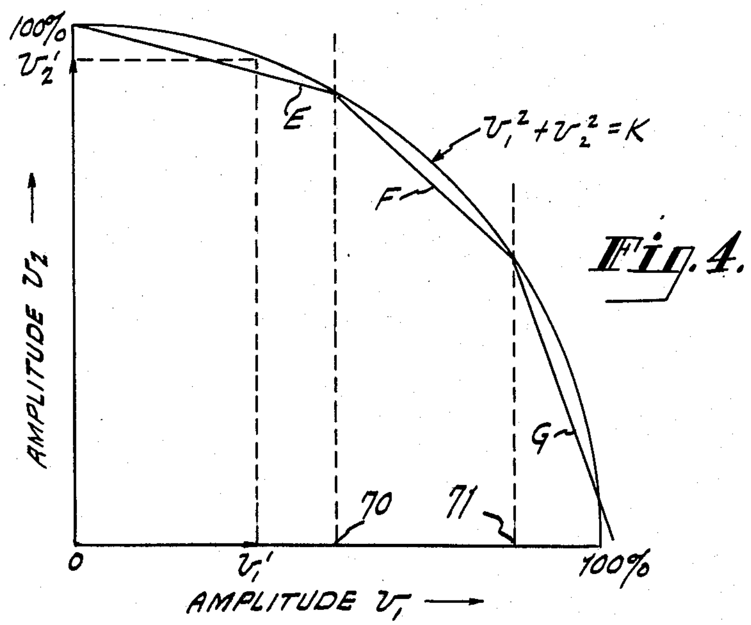
Figure 4 is a voltage chart which will be used in explaining the operation of the circuit of Figure 3 and the system of Figure 1.

Figure 1 shows a television picture signal transmitter. The output of video signal source 10 is a voltage varying in amplitude in accordance with picture information. The output of the video signal source 10 is applied thru level balancing means 11, over lead 12 to video amplifier 13, and over lead 14 to amplitude modifying circuit 15. The amplitude modifying circuit 15 receives an input voltage having an instantaneous value $v_1$ and provides an output voltage $v_2$ on lead 16 which is equal to $\sqrt{K-v_1^2}$, where K is a constant. The relationship between the voltage $v_1$ applied to the amplitude modifying circuit 15, and the output voltage $v_2$ therefrom is shown by the chart of Figure 4. The relationship is such that $v_1^2+v_2^2$ is equal to a constant K. On the chart of Figure 4, with a given instantaneous value for the input voltage $v_1$, the corresponding output voltage $v_2$ may be found by drawing a vertical line from the abscissa axis to the circular curve, and then a horizontal line from the intersection with the circular curve to the ordinate axis. The details of the circuit 15 for translating the voltage $v_1$ to the voltage $v_2$ will be described after the systems of Figures 1 and 2 have been described.

The voltage $v_1$ is amplified in video amplifier 13 and applied to an amplitude modulator 17. Modulator 17 is also receptive of the output of a radio frequency oscillator 18, so that the output on lead 19 from the modulator 17 is a radio frequency carrier, amplitude modulated by the video signal from the source 10. The output of the modulator 17 may be represented as a voltage vector $V_1$ which varies in amplitude and rotates at the radio frequency rate.

The output of the amplitude modifying circuit 15 is applied over lead 16 to a video amplifier 20. The output of amplifier 20 is applied to an amplitude modulator 21 which is also receptive, thru a 90 degree phase shift circuit 22, of an output of the radio frequency oscillator 18. The output on lead 23 of the amplitude modulator 21 may be represented as a voltage vector $V_2$ which varies in amplitude and which has a 90 degree phase displacement compared with the voltage $V_1$. The amplitude of the voltage vector $V_2$ at all instants of time is equal to $\sqrt{K-V_1^2}$. It is thus apparent that the vector sum or the resultant of the voltages $V_1$ and $V_2$ is always constant in amplitude. The resultant, however, varies in phase in accordance with the video signal, over a 90 degree sector.

The outputs of modulators 17 and 21 on leads 19 and 23, respectively, are applied to the two inputs of a split balun bridge diplexer 25. The diplexer 25 includes an inner conductor 26, an intermediate coaxial conductor 27, and an outer coaxial conductor 28. The intermediate coaxial conductor 27 is slotted for a distance of a quarter wavelength from one end to provide two parallel conductors 29 and 30. The inner conductor 26 is connected to the terminal end of the conductor 29. Input lead 19 is also connected to the terminal end of conductor 29, and input lead 23 is connected to the terminal end of the conductor 30.

An output lead 32 is taken from the diplexer 25 at the center point on the intermediate conductor 27 and is applied to the input of a radio frequency amplifier 33. Another output of the diplexer 25 is taken from inner conductor 26 thru lead 34 and delivered to a second radio frequency amplifier 35.

The input signals $V_1$ and $V_2$ applied to the diplexer 25 over leads 19 and 23, respectively, both appear without change in relative phase on the output lead 32 of the diplexer. The vector sum $V'$ of the voltages $V_1$ and $V_2$ is therefore amplified in radio frequency amplifier 33. Because of the relationship between the voltages $V_1$ and $V_2$, the resulant $V'$ is a constant amplitude voltage vector which fluctuates in phase in accordance with the video signal. Since the voltage vector $V'$ is constant in amplitude, the radio frequency amplifier 33 does not introduce unwanted phase distortion.

The two input signals $V_1$ and $V_2$ applied to the diplexer 25 are also available at the output lead 34 from the diplexer. The input voltage $V_2$, however, is delayed 180 degrees in phase relative to the voltage $V_1$ by reason of its having to go an additional distance of a half wavelength from the terminal end of the conductor 30 to the terminal end of the conductor 29 where it is connected to the inner conductor 26. The resultant voltage $V''$ on output lead 34 which is amplified by radio frequency amplifier 35 is thus a constant amplitude voltage vector which varies in phase in accordance with the video signal. The resultant voltage $V''$ is phase modulated in the opposite direction from the resultant voltage $V'$ which is amplified in amplifier 33. In other words, the voltages $V'$ and $V''$ are differentially phase modulated signals of constant amplitude.

The two signals $V'$ and $V''$ amplified in radio frequency amplifiers 33 and 35, respectively, are applied over leads 37 and 38, respectively, to two inputs of a second split balun bridge diplexer 40. Diplexer 40 may be similar to diplexer 25 but should be designed to handle the higher powers resulting from the amplification of the signals in radio frequency amplifiers 33 and 35.

Diplexer 40 has an output lead 43 connected to a utilization device such as an antenna 44, and has a second output lead 45 connected to an absorbing or balancing resistor 46. The input signals $V'$ and $V''$ to the diplexer 40 on input leads 37 and 38, respectively, travel the same distance to the output lead 43 so that the two signals add vectorially in the output lead 43 to provide a resultant voltage $E_a$. The resultant voltage $E_a$ is applied to the antenna 44 from which the energy is radiated into space. The signal $V''$ on input lead 38 must travel a half wavelength further to reach output lead 45 than the input signal $V'$ on input lead 37. The signal $V''$ is thus delayed 180 degrees in going thru the diplexer 40 to the output lead 45. The resultant of $V'$ and $V''$ is a voltage $E_r$ which is applied from lead 45 to the absorbing or balancing resistor 46.

Diplexers 25 and 40 may be considered as bridges having a first set of opposite terminals A and B and a second set of opposite terminals C and D. It will be noted that the distance from A to C, from A to D, and from C to B is a quarter wavelength in each case. By contrast, the distance for energy to travel from B to D is three-quarters of a wavelength, or a half-wavelength longer than the length of the other three legs of the bridge.

The terminals A and B may be used as the input terminals, or, as in the case of diplexer 40, the terminals C and D may be employed as the input terminals. When terminals A and B are input terminals, terminal C provides an output which is the vector sum of the inputs, and terminal D provides an output which is the vector difference of the inputs. When terminals C and D are input terminals, terminal A provides the sum output and terminal B provides the difference output. It will further be noted that input terminals A and B are one-half wavelength distant from each other so that the two sources connected to the input terminals A and B are isolated from each other. Similarly, the input terminals C and D of diplexer 40 are also one-half wavelength removed from each other so that the signals applied to the two input terminals are isolated from each other. The electrical lengths L in the two designated paths between the diplexer 25 and diplexer 40 should be equal, or should differ by an integral number of full wavelengths.

In the operation of the system of Figure 1, the video signal $v_1$ from the source 10 is amplified in video amplifier 13 and applied to the amplitude modulator 17, where it modulates the radio frequency signal from oscillator 18. The output on lead 19 from the amplitude modulator 17 is a rotating voltage vector $V_1$ fluctuating in amplitude in accordance with the video signal. The video signal $v_1$ is also applied to amplitude modifying circuit 15 to produce an output voltage $v_2$ on lead 16 which varies inversely with voltage $v_1$ according to the law illustrated in the chart of Figure 4. When the video signal $v_1$ is large, the signal $v_2$ is small, and when $v_1$ is small, $v_2$ is large. The signal $v_2$ is amplified in video amplifier 20 and applied to the amplitude modulator 21 to modulate a 90 degree phase shifted output from the radio frequency oscillator 18. The output of the modulator 21 on lead 23 is therefore an amplitude modulated radio frequency signal having a constant 90 degree phase displacement relative to the signal $V_1$ from the modulator 17.

The signals $V_1$ and $V_2$ are combined in the diplexer 25. The total power of the signals $V_1$ and $V_2$ is a constant and does not vary with the video signals $v_1$ from the source 10. The total power is constant because $V_1$ and $V_2$ are 90 degrees out of phase, and because power varies as the square of the voltage, and because $V_2$ is made to vary so that $V_1$ squared plus $V_2$ squared is equal to a constant.

Half of the total power applied to the diplexer 25 appears in the output lead 32, and the other half of the power appears in the output lead 34. The resultant voltage V′ in the path including the lead 32, radio frequency amplifier 33 and lead 37 is the vector sum of the out-of-phase voltages $V_1$ and $V_2$. Of course, strictly speaking, the voltages $V_1$ and $V_2$ on the output lead 32 from the diplexer are at values about 0.7 times the respective voltages applied to the input of the diplexer. The voltages are then amplified in the amplifier 33. It is thus far apparent that the resultant voltage V′ on lead 37 is a voltage of constant amplitude which varies in phase in accordance with the relative amplitudes of the two component voltages $V_1$ and $V_2$. Therefore, the radio frequency amplifier 33 operates at constant amplitude so that no phase modulation distortion is introduced.

The other one-half of the power applied to the input of diplexer 25 appears in the path including lead 34, radio frequency amplifier 35 and lead 38. However, in going thru the diplexer 25, the input voltage $V_2$ is delayed in phase by one-half wavelength compared with the voltage $V_1$. Therefore, the resultant voltage V″ in the path 34, 35 and 38 is a constant amplitude voltage fluctuating in phase in an adjacent quadrant compared with that in which the voltage V′ is varying. It is thus apparent that the voltages V′ and V″ are of equal amplitude and are differentially phase modulated. It is also apparent that the radio frequency amplifier 35 also operates at constant amplitude so as not to introduce distortion.

The differentially phase modulated signals V′ and V″ on leads 37 and 38, respectively, are applied to the inputs of diplexer 40. The sum output on lead 43 of diplexer 40 is applied to an antenna 44. The voltage applied to the antenna 44 is the vector sum of differentially phase modulated voltages V′ and V″. The resultant voltage is $E_a$. It will be noted that when the video signal $v_1$ has a maximum value, $v_2$ has a zero value, and voltages V′ and V″ are in phase with each other. Under this condition, the voltage $E_a$ is the arithmetic sum of V′ and V″. When the video signal $v_1$ is substantially zero, the voltages V′ and V″ are substantially 180 degrees out of phase, so that the resultant voltage $E_a$ is substantially zero.

The difference output on lead 45 from the diplexer 40 is applied to an absorbing and balancing resistor 46. The voltage V″ applied to the resistor 46 is shifted 180 degrees in phase in the diplexer 40, and the resultant with the voltage V′ is designated voltage $E_r$. It will be apparent that when the voltage $E_a$ applied to antenna 44 is large, the voltage $E_r$ applied to resistor 46 is small, and vice versa. Of course, at any instant of time the power applied to the antenna 44 is proportional to the square of $E_a$, and the power in the absorbing resistor 46 is proportional to the square of $E_r$.

The voltage $E_a$ is proportional to the voltage $V_1$, and the voltage $V_1$ is proportional to the video signal $v_1$, so that the voltage $E_a$ applied to the antenna 44 is proportional to the video signal $v_1$. The purpose of the voltage $v_2$, and the resulting voltage $V_2$, is to cooperate with the voltage $V_1$ to provide resultants V′ and V″ having constant amplitude and which thus may be amplified in radio frequency amplifiers 33 and 35 without introducing distortion. That portion of the energy in the system resulting from the voltages $v_2$ and $V_2$ is dissipated in the absorbing resistor 46 by means of a suitable heat exchanger. The heat generated in resistor 46 may be utilized for some purpose at the radio transmitting station. In any case, the cost of the electric energy dissipated in the resistor 46 is a small percentage of the cost of operating a radio transmitter. The advantages of being able to employ constant level radio frequency amplifiers 33 and 35 far outweigh the cost of the electric energy dissipated in the resistor 46. The advantages of the system of this invention are particularly great for transmitters operating in the ultra-high frequency range, especially when it is desired to radiate a large amount of radio frequency power, such as 50 or 100 kilowatts, for example.

It will be seen that the basic philosophy behind the invention is the generation of voltages $v_2$ and $V_2$ which are so related with the useful voltages $v_1$ and $V_1$ that the resultant voltages V′ and V″ amplified in amplifiers 33 and 35 are differentially phase modulated voltages of constant amplitude. The voltages V′ and V″ are of constant amplitude at all instants of time because the voltages $V_1$ and $V_2$ are related to each other so that the sum of the squares thereof is equal to a constant. The voltages $V_1$ and $V_2$ may be considered as the varying legs of right triangles having a contant hyptenuse V′.

Reference will now be made to Figure 2, showing an addition which may be made to the system of Figure 1 so as to provide a transmitter for handling both the video signal and the sound signal of a television station. It is common practice in the television broadcasting art to utilize two separate independent transmitters for generating and amplifying the video signal and the sound signal. The two signals are usually combined in a diplexer prior to application to an antenna system. According to the present invention, the radio frequency amplifiers 33 and 35 are used to amplify both the video signal and the sound signal.

In Figure 2, there is provided a source 49 of radio frequency carrier which is frequency modulated by the sound signal. This is in accordance with the television system in the United States, where the picture signal is used to amplitude modulate a radio frequency carrier and the sound signal is used to frequency modulate a radio frequency carrier of a slightly different frequency.

The output of the source 49 is applied to a combining unit 50 over a lead 51. The combining unit 50 is inserted in the lead 19 of Figure 1 between the amplitude modulator 17 and one input of the diplexer 25. The combining unit 50 may be any one of a number of known types such as a Maxwell bridge, a diplexer like the diplexers 25 and 40 in Figure 1, or a filterplexer such as is commonly employed to combine the outputs of picture and sound transmitters in television stations. The amplitude level of the sound signal applied over lead 51 to the combining unit 50 should bear a predetermined ratio to the amplitude of the picture signal applied over lead 19 to the combining unit 50. According to television standards in the United States, 60% of the radiated power from a television station should be in the picture signal, and 40% should be in the sound signal.

The radio frequency carrier which is frequency modulated by the sound signal and applied to the combining unit 50 is a signal of constant amplitude. The signal is applied to the diplexer 25 and appears on the two output leads 32 and 34 therefrom. Since the signal is a constant amplitude frequency modulated signal, the radio frequency amplifiers 33 and 35 continue to operate at constant amplitude, the amplitude being a higher level by reason of the presence of both the picture signal and the sound signal therein. There is no difficulty from the fact that the sound carrier and the picture carrier are at slightly different frequencies, since the diplexers 25 and 40 are of a type having sufficiently broad band characteristics to simultaneously handle all the frequencies present.

Among the advangtages of the system of Figure 2 is the fact that a relatively small and inexpensive diplexer combining unit 50 may be employed, because at this point the signals are at relatively low levels. It is then unnecessary to employ a high power diplexer for combining the separate amplified outputs of a picture transmitter and a sound transmitter before application to the antenna.

A further advantage resides in the fact that the high power radio frequency amplifiers 33 and 35 are used in common for amplifying both the picture signal and the sound signal.

Figure 3:
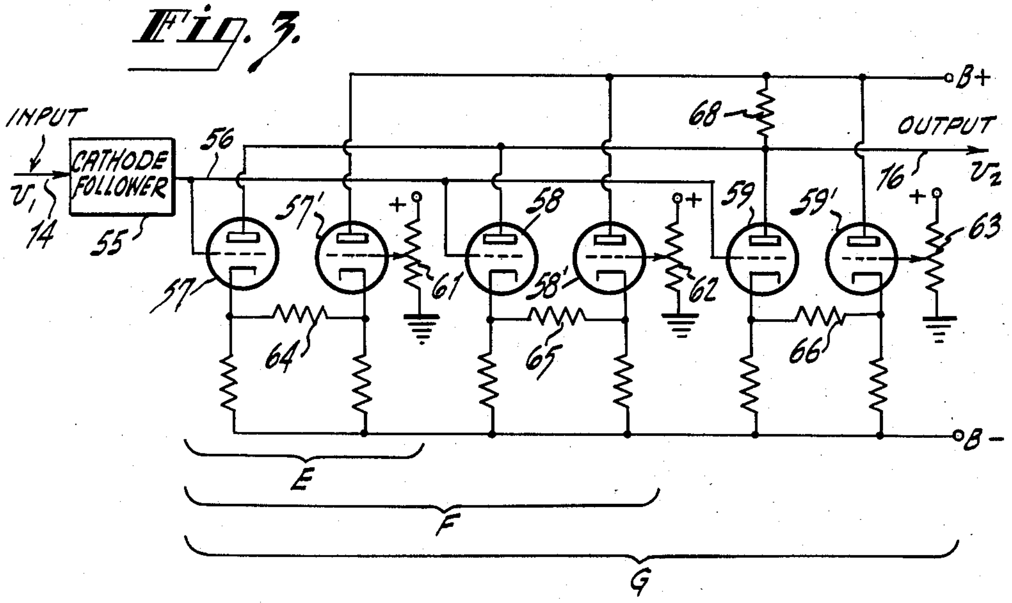
Figure 3 is a circuit diagram of an amplitude modifying circuit which may be used in the system of Figure 1.

Reference will now be made to Figures 3 and 4 for a description of an amplitude modifying circuit suitable for use in the box 15 of Figure 1. The chart of Figure 4 shows the desired relationship between the output voltage $v_2$ and the input voltage $v_1$, the relationship being represented by the circular curve labeled $v_1^2+v_2^2=K$. By way of example, if at any instant of time the voltage $v_1$ is equal to $v_1'$, the desired output voltage $v_2$ is struck off as having a value $v_2'$. At the extremes, if $v_1$ is zero, $v_2$ is a maximum; and if $v_1$ is a maximum, $v_2$ is zero.

In practice, it is difficult to construct a vacuum tube circuit which will exactly provide the desired circular characteristics. The greater the number of tubes employed in the circuit, the more closely the desired characteristics can be obtained. The circuit of Figure 3 shown by way of example includes three individual circuits providing characteristics which approximate the circular curve along the broken line sections labeled E, F, and G. It has been found that a circuit using about twice as many tubes as that shown in Figure 3 is necessary to approximate the desired characteristic curve to a satisfactory degree.

Referring to Figure 3, the input signal $v_1$ is applied over lead 14 thru a cathode follower 55 to a bus 56 connected to the control grids of operating tubes 57, 58 and 59. Control tubes 57', 58' and 59' are associated with respective ones of the operating tubes 57, 58, 59 to form three pairs of tubes. The control grids of the control tubes are connected to adjustable sources of bias 61, 62, and 63. The cathodes of the tubes in each pair are coupled together by respective resistors 64, 65, and 66 having different values. All of the cathodes are connected to the B— bus thru relatively large value resistors. The plates of tubes 57, 58 and 59 are connected to the B+ bus thru a common plate resistor 68. The plates of control tubes 57', 58' and 59' are directly connected to the B+ bus.

The adjustable bias sources 61, 62, and 63 control the level of input voltage $v_1$ at which the operating tubes 57, 58, and 59 become conductive. The cathode coupling resistors 64, 65 and 66 control the gain of the operating tubes 57, 58 and 59 when they are conductive.

The control tube 57' acts as a cathode follower providing a cathode potential in accordance with the value of the adjustable bias 61 applied to the control grid. The bias on the cathode of control tube 57' is coupled thru resistor 64 to the cathode of tube 57 to provide a bias on the tube 57 which determines the input voltage $v_1$ applied to the control grid which will render the tube 57 conductive. Since the tubes 57 and 57' are in the first stage of the circuit, the bias 61 is adjusted so that tube 57 is conductive for all values of input voltage $v_1$. The The resistor 64 is a degenerative cathode resistor for the tube 57, since it is connected from the cathode of tube 57 to the low impedance point at the cathode of tube 57'. The value of the resistor 64 determines the amount of degeneration, and therefore the amount of gain provided by the tube at the output bus 16. In order to provide the gain characteristic E of Figure 4, the gain of tube 57 should be small. Therefore, a large degenerative resistor 64 is employed. It will be seen that as the input voltage $v_1$ increases, more current is drawn by the tube 57 thru the common plate resistor 68 so that the potential on output bus 16 falls in accordance with the characteristic curve E of Figure 4.

In the second stage of the circuit of Figure 3, the adjustable bias 62 is set to a value which biases the cathode of tube 58 to a point such that tube 58 remains cut off until the amplitude of the input voltage $v_1$ reaches the value 70 in the chart of Figure 4. The value of resistor 65 is smaller than the value of resistor 64, so that the tube 58 has a larger gain when it is conducting. When the input voltage $v_1$ is larger than the value designated 70, both tubes 58 and 57 are conductive. The combined currents drawn by the tubes thru the common plate resistor 68 results in the characteristic designated F in Figure 4.

In the third stage of the circuit, the adjustable bias 63 is set so that the tube 59 is biased to cut off until the input voltage $v_1$ reaches a value designated 71 on the chart of Figure 4. The resistor 66 is made considerably smaller in value than the resistors 65 and 64, so that the tube 59 will have a considerably higher gain than the tubes 58 and 57. When the input voltage $v_1$ is larger than the value designated 71, all of tubes 59, 58 and 57 are simultaneously conductive and drawing current thru the common plate resistor 68. The result of conductivity in all three tubes results in the characteristic designated G on the chart of Figure 4. As the input voltage $v_1$ decreases from its maximum value tube 59 is rendered non-conductive when the input voltage falls below the value 71, and tube 58 is also rendered non-conductive when the input voltage falls below the level designated 70.

It will be seen that by providing a sufficiently large number of stages each of which becomes effective at a successively higher value of input voltage $v_1$, the desired circular characteristic curve can be very closely approximated. It will also be seen that by suitably adjusting the bias potentials applied to the grids of the control tubes, and by adjusting the values of the cathode coupling resistors, any desired response characteristic, other than the circular characteristic illustrated, may be obtained.

The system of Figure 1 is designed to include an amplitude modifying circuit 15 which provides the circular characteristic shown in the chart of Figure 4. This particular characteristic is used because the voltages $V_1$ and $V_2$ are at a 90 degree phase relationship with each other. The resultants V' and V'' are thus voltages of constant amplitude. It will be understood that if a different than 90 degree phase relationship is provided for the voltages $V_1$ and $V_2$, an amplitude modifying circuit having an appropriately different characteristic could be employed to achieve the desired results. The use of the 90 degree phase relationship and the circular characteristic in the modifying circuit 15 is the most straightforward and advantageous arrangement.

It is apparent that according to this invention there is provided an improved transmitter utilizing constant amplitude amplifiers, a transmitter capable of simultaneously amplifying television picture and sound signals, and a novel amplitude modifying circuit.

What is claimed is:

1. A radio transmitter comprising a source of two radio frequency carriers of the same frequency displaced 90 degrees in phase, means for amplitude modulating one of said carriers with an intelligence signal $v_1$, means for amplitude modulating the other of said carriers with an intelligence signal $v_2$ equal to $\sqrt{K-v_1^2}$ where K is a constant, thereby producing two amplitude modulated waves which are in quadrature and whose amplitudes vary in opposite directions in response to the first-mentioned intelligence signal, first and second diplexers each having two inputs and two outputs, means coupling the two amplitude modulated carriers to respective inputs of said first diplexer, said first diplexer operating to produce on one of its two outputs the vectorial sum of the two inputs applied thereto and operating to produce on the other of its two outputs the vectorial difference of the two inputs applied thereto, said vectorial sum and vectorial difference comprising signals of constant amplitude which are phase modulated differentially; means coupling respective outputs of said first diplexer and respective inputs of said second diplexer, said second diplexer likewise operating to produce on one of its two outputs the vectorial sum of the two inputs applied thereto and operating to produce on the other of its two outputs the vectorial difference of the two inputs applied thereto, a utilization device coupled to one of the outputs of said second diplexer, and a balancing resistor coupled to the other output of said second diplexer.

2. A radio transmitter comprising a source of two radio frequency carriers of the same frequency displaced 90 degrees in phase, means for amplitude modulating one of said carriers with an intelligence signal $v_1$, means for amplitude modulating the other of said carriers with an intelligence signal $v_2$ equal to $\sqrt{K-v_1^2}$ where K is a constant, thereby producing two amplitude modulated waves which are in quadrature and whose amplitudes vary in opposite directions in response to the first-mentioned intelligence signal, first and second diplexers each having two inputs and two outputs, means coupling said two modulated carriers to respective inputs of said first diplexer, said diplexer operating to produce on one of its two outputs the vectorial sum of the two inputs applied thereto and operating to produce on the other of its two outputs the vectorial difference of the two inputs applied thereto, said vectorial sum and vectorial difference comprising signals of constant amplitude which are phase modulated differentially; separate radio frequency amplifiers coupled between respective outputs of said first diplexer and respective inputs of said second diplexer, said second diplexer likewise operating to produce on one of its two outputs the vectorial sum of the two inputs applied thereto and operating to produce on the other of its two outputs the vectorial difference of the two inputs applied thereto, a utilization device coupled to one of the outputs of said second diplexer, and a balancing resistor coupled to the other output of said second diplexer.

3. A radio transmitter as defined in claim 2, wherein said diplexers are split balun bridge diplexers constructed of coaxial line sections.

4. A radio transmitter comprising a source of an intelligence signal having an instantaneous amplitude $v_1$, an amplitude modifying circuit receptive of the output of said source for generating an intelligence signal $v_2$ having an instantaneous value equal to $\sqrt{K-v_1^2}$ where K is a constant, a source of two radio frequency oscillations of the same frequency displaced 90 degrees in phase, a first modulator for amplitude modulating one of said oscillations by said signal $v_1$, a second modulator for amplitude modulating the other of said oscillations by said signal $v_2$, said first and second modulators operating to produce respective amplitude modulated waves which are in quadrature and whose amplitudes vary in opposite directions in response to the first-mentioned intelligence signal, a first bridge diplexer having two inputs coupled to respective outputs of said modulators and having two outputs, said first diplexer operating to produce on one of its two outputs the vectorial sum of the two inputs applied thereto and operating to produce on the other of its two outputs the vectorial difference of the two inputs applied thereto, said vectorial sum and vectorial difference comprising signals of constant amplitude which are phase modulated differentially; a second bridge diplexer having two inputs and two outputs, said second diplexer likewise operating to produce on one of its two outputs the vectorial sum of the two inputs applied thereto and operating to produce on the other of its two outputs the vectorial difference of the two inputs applied thereto, two separate radio frequency amplifiers coupled between respective outputs of said first diplexer and inputs of said second diplexer, a utilization device coupled to one of the outputs of said second diplexer, and a balancing impedance coupled to the other output of said second diplexer.

5. A television transmitter comprising a source of a video signal having an instantaneous amplitude $v_1$, an amplitude modifying circuit receptive of the output of said source for generating a video signal $v_2$ having an instantaneous value equal to $\sqrt{K-v_1^2}$ where K is a constant, first and second amplitude modulators, two video signal amplifiers respectively coupling the output $v_1$ from said source and the output $v_2$ from said amplitude modifying circuit to respective ones of said first and second amplitude modulators, a radio frequency oscillator, phase shift means for coupling the output of said oscillator to said first and second modulators as 90 degree phase displaced oscillations, said first and second modulators operating to produce respective amplitude modulated waves which are in quadrature and whose amplitudes vary in opposite directions in response to the first-mentioned video signal, first and second bridge diplexers each having two inputs and two outputs, means coupling the respective outputs of said first and second modulators to respective inputs of said first diplexer, said first diplexer operating to produce on one of its two outputs the vectorial sum of the two inputs applied thereto and operating to produce on the other of its two outputs the vectorial difference of the two inputs applied thereto, said vectorial sum and vectorial difference comprising signals of constant amplitude which are phase modulated differentially; two independent radio frequency amplifiers coupling respective outputs of said first diplexer to respective inputs of said second diplexer, said second diplexer likewise operating to produce on one of its two outputs the vectorial sum of the two inputs applied thereto and operating to produce on the other of its two outputs the vectorial difference of the two inputs applied thereto, a transmitting antenna coupled to one output of said second diplexer, and an absorbing resistor connected to the other output of said second diplexer.

6. A television transmitter comprising first and second amplitude modulators, a first source of radio frequency carrier having an output coupled to said first modulator, a second source of radio frequency carrier of the same frequency but displaced 90 degrees in phase having an output coupled to said second modulator, a source of video signal having an instantaneous amplitude $v_1$ coupled to said first amplitude modulator, an amplitude modifying circuit having an input coupled to said source of video signal for generating a voltage having an instantaneous value $v_2$ equal to $\sqrt{K-v_1^2}$ where K is equal to a constant, means to apply the output of said modifying circuit to said second amplitude modulator, said first and second modulators operating to produce respective amplitude modulated waves which are in quadrature and whose amplitudes vary in opposite directions in response to the video signal, a source of radio frequency carrier which is frequently modulated by a sound signal, a combining unit having an input coupled to the output of said last named source and having an input coupled to the output of said first amplitude modulator, first and second bridge diplexers each having two inputs and two outputs, means coupling the output of said combining unit to one input of said first diplexer, means coupling the output of said second amplitude modulator to the other input of said first diplexer, said first diplexer operating to produce on one of its two outputs the vectorial sum of the two inputs applied thereto and operating to produce on the other of its two outputs the vectorial difference of the two inputs applied thereto, said vectorial sum and vectorial difference comprising signals of constant amplitude which are phase modulated differentially; separate radio frequency amplifiers coupled between respective outputs of said first diplexer and respective inputs of said second diplexer, said second diplexer likewise operating to produce on one of its two outputs the vectorial sum of the two inputs applied thereto and operating to produce on the other of its two outputs the vectorial difference of the two inputs applied thereto, an antenna coupled to one output of said second diplexer, and an absorbing resistor connected to the other output of said second diplexer.

7. A radio transmitter as defined in claim 6, wherein said amplitude modifying circuit comprises a plurality of pairs of vacuum tubes each including cathode, grid, and plate electrodes, each pair including an operating tube and a cathode follower control tube, means coupling said first-mentioned intelligence signal to the grids of all operating tubes through connections devoid of concentrated impedance, a common output resistor connected to the plates of all operating tubes, cathode coupling resistors coupling the cathodes of the operating tube and the control tube in each pair, and means to apply an adjustable bias to the grid of each control tube to determine the cathode bias on the respective operating tube, whereby the number of operating tubes which are conductive varies with the amplitude of the input signal, and whereby the values of said cathode coupling resistors determine the gains of the respective operating tubes.

8. An amplitude modifying circuit for providing an output voltage varying as a predetermined function of a single input voltage, comprising a plurality of pairs of vacuum tubes each having cathode, grid, and anode electrodes, each pair including an operating tube and a cathode follower control tube; means coupling the input voltage to the grids of all operating tubes through connections devoid of concentrated impedance and devoid of electron discharge paths, a common load resistor connected to the anodes of all of the plurality of operating tubes, connections for taking output voltage from across said common resistor, cathode coupling resistors coupling the cathodes of the operating tube and the control tube in each pair, and means to apply an adjustable direct current bias to the grid of each control tube to determine the cathode bias on the respective operating tube, whereby the number of operating tubes which are conductive varies with the amplitude of the input signal, and whereby the values of said cathode coupling resistors determine the gains of the respective operating tubes.

References Cited in the file of this patent

UNITED STATES PATENTS

| | | |
|---|---|---|
| 1,892,383 | Chireix | Dec. 27, 1932 |
| 1,946,308 | Chireix | Feb. 6, 1934 |
| 2,053,014 | Walton | Sept. 1, 1936 |
| 2,441,387 | Berger et al. | May 11, 1948 |
| 2,469,747 | Shenk | May 10, 1949 |
| 2,480,201 | Selove | Aug. 30, 1949 |
| 2,535,257 | Berger | Dec. 26, 1950 |
| 2,566,876 | Dome | Sept. 4, 1951 |
| 2,581,456 | Swift | Jan. 8, 1952 |
| 2,614,246 | Dome | Oct. 14, 1952 |
| 2,648,766 | Eberhard | Aug. 11, 1953 |